Jan. 10, 1956  A. L. JUDSON  2,729,978
GYROSCOPE CAGING SYSTEM
Filed Nov. 18, 1952  2 Sheets—Sheet 1
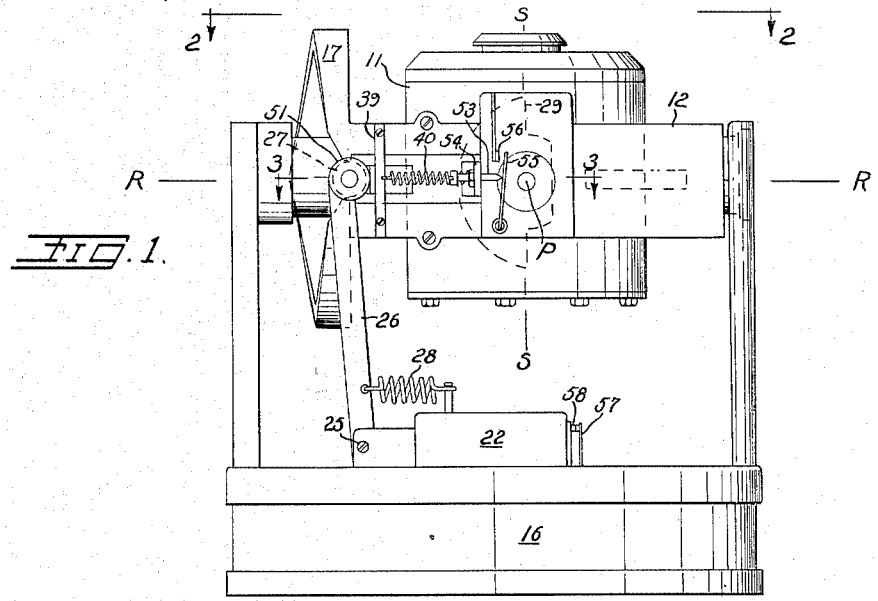
INVENTOR
Albert L. Judson
BY
AGENT Jan. 10, 1956    A. L. JUDSON    2,729,978
GYROSCOPE CAGING SYSTEM
Filed Nov. 18, 1952    2 Sheets-Sheet 2

INVENTOR
Albert L. Judson
BY
AGENT

United States Patent Office 2,729,978
Patented Jan. 10, 1956

2,729,978

GYROSCOPE CAGING SYSTEM

Albert L. Judson, Portland, Oreg., assignor to Iron Fireman Manufacturing Company, Portland, Oreg.

Application November 18, 1952, Serial No. 321,141

6 Claims. (Cl. 74—5.1)

This invention relates generally to gyroscopes, and more particularly to improved means for automatically cycling a gyroscopic device through a caging and release operation.

The gyroscope to which this improvement is adapted comprises a rotor adapted to spin in a support about a spin axis, a nominally stationary frame, and a gimbal ring mounted in said frame for rotation about one axis, the support for said rotor being mounted in said gimbal ring for rotation about another axis perpendicular to both said spin axis and said one axis.

It is an object of this invention to provide a gyroscope caging and centering means with which a caging cycle can be initiated from a point remote from the gyroscope after which the said means will automatically complete the cycle of caging and centering the gyroscope and then release the gyroscope for freedom of movement about its three axes.

It is a second object to provide means for controlling the precessional forces of a gyroscope whereby the gyroscope will cage or center itself with a minimum application of external forces to the gyroscope system.

It is a third object to provide electric means for remotely controlling the caging and uncaging cycle of a gyroscope including a remote electric switch having a normal position to which it is biased and an other position, the normal position of said switch being adapted to withhold the caging means from interference with the freedom of movement of said gyroscope and the other position of said switch being adapted to initiate a cycle of caging the gyroscope.

It is a fourth object to provide such an electric means which will permit the completion of the caging or centering cycle of the gyroscope whenever the cycle is started by the momentary closure of said switch in said other position.

It is a fifth object to provide such an electric means which will permit the gyroscope to be held in caged position after the gyroscope is caged and said switch is held in said other position.

It is a sixth object to provide such an electric means which will permit the gyroscope to be caged automatically and held in caged position on an electric failure of said electric means.

How these and other objects are attained will be made clear by the following description referring to the attached drawings in which Figure 1 is a view in side elevation of a gyroscope equipped in accordance with my invention.

Figure 2 is a top view of the device of Figure 1.

Figure 3 is a fragmentary section along the line 3—3 of Figure 1.

Figure 4 is a fragmentary view along the line 4—4 of Figure 2.

Like numerals of reference refer to like parts in the several figures of the drawings.

Figure 5:
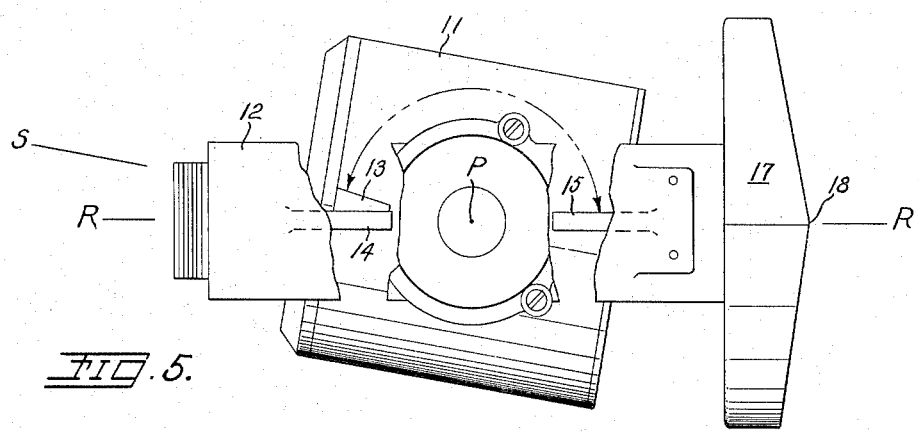
Figure 5 is a fragmentary elevation of the gimbal ring and rotor support as viewed from the far side of Figure 1.

Referring now to the drawings there is shown generally in Figs. 1 and 2 a gyroscope having a rotor (not shown) mounted on bearings (not shown) within the rotor support case 11 to spin about the spin axis S. In the preferred form of my invention the gyroscope rotor is driven at a nominal constant speed by an electric motor within case 11 but since the method of spinning the rotor is no part of this invention, in the interest of clarity of exposition the spinning parts and the parts required for their actuation are not here shown or described.

The rotor case or support 11 is mounted in gimbal ring 12 for free rotary movement about the axis P. It should be noted however that case 11 carries a boss or stop 13 adapted to cooperate with stops 14 and 15 on gimbal ring 12 (see also Fig. 5) to limit the rotation of support 11 about axis P to about eighty five degrees from its vertical or centered position in either direction.

Gimbal ring 12 is mounted in the gyroscope base or frame 16 freely to rotate about the axis R.

Figure 6:
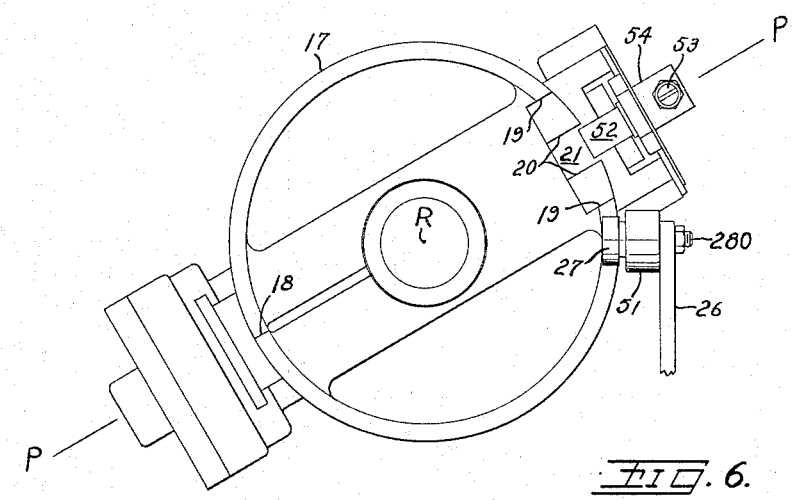
Figure 6 is an end view of the gimbal ring as viewed from the left side of Figure 2.

Secured to gimbal ring 12 to rotate therewith is face cam 17 with two cam surfaces, similar but of opposite hand, both starting at a high point 18 farthest from a vertical plane through the P axis and converging down the cam surfaces towards this plane to the points 19 (see also Figure 6) and then more abruptly to the points 20 between which the cam is cut away to form the gap 21.

Mounted in base 16 is a solenoid having a body 22 enclosing a pair of solenoid coils 23 and 24 (shown only schematically in Fig. 7) surrounding a plunger (not shown). Pivoted at 25 in body 22 is lever 26 pivoted at its lower end (not shown) to the solenoid plunger or core. Lever 26 carries at its upper end face cam follower roller 27 freely rotatable on stud 280. Roller 27 is slightly smaller in diameter than the width of gap 21 and will pass therethrough. Tension spring 28 biases roller 27 carried on lever 26 towards the vertical plane through axis P and if gimbal ring 12 is uncentered or displaced about the R axis from a horizontal position roller 27 riding on one of the faces of cam 17 will urge gimbal ring 12 towards a horizontal or centered position. At the horizontal or centered position of gimbal ring 12, lever 26 urged by spring 28 will carry roller 27 into notch 21 thereby locking gimbal ring 12 in its horizontal or centered position.

Secured to rotor case or support 11 freely to rotate therewith is edge cam 29 with two cam surfaces, similar but of opposite hand. These cam surfaces are approximately circular about the axis P but are of greatest radius at diametrically opposed points 30 and 31 and of gradually decreasing radius as the surfaces approach their points of minimum radius 32 and 33 separated by notch 34 (Figure 4). Edge cam follower roller 35 freely rotatable on stud 36 secured to follower slider 37 is guided in gimbal ring 12 to slide radially towards and away from axis P. Primary slider 38 retained in position on gimbal ring 12 by retaining plate 39 secured to gimbal ring 12 is guided in gimbal ring 12 to slide radially towards and away from axis P.

Spring 40 strained between plate 39 and stud 41 secured to slider 38 biases slider 38 away from axis P. Stud 42 secured to slider 38 allows freedom of movement between sliders 37 and 38 within the longitudinal limits of the engagement of stud 42 with the ends of slot 43 formed in plate 44 of slider 37. It is seen that as spring 40 biases slider 38 away from axis P, stud 42 engaging the left end of slot 43 holds follower slider 37 away from engagement of roller 35 with cam 29.

Compression spring 45 piloted at one end on stud 46 fixed to slider 37 and at the other end on stud 47 fixed to angle clip 48 secured to primary slider 38 by screw 49 is guided in hole 50 formed in gimbal ring 12 and biases sliders 37 and 38 in opposite directions radial of axis P.

When face cam follower roller 27 enters gap 21, roller 51 also freely rotatable on stud 280 rests on face 52 of angle clip 48 thus pressing primary slider 38 radially inward toward axis P overcoming the bias of spring 40. At this time compression spring 45 causes follower slider 37 to move radially inward towards axis P until roller 35 engages one of the cam surfaces of cam 29 fixed to support 11. The pressure of roller 35 on cam 29 urges support 11 towards its centered position where axis S is normal to axis R. When support 11 is centered, roller 35 drops off the cam surfaces of cam 29 and enters notch 34 a sufficient amount to lock support 11 in its centered position and also sufficiently to advance switch operating screw 53 threaded into ear 54 of slider 37 against switch blade 55 insulatedly mounted on gimbal ring 12 and pushes blade 55 away from stationary switch contact 56 also insulatedly mounted on gimbal ring 12.

When it is desired to put the gyroscope in normal operation the rotor in support 11 is brought up to full spinning speed then both solenoid coils 23 and 24 are energized thus pulling the solenoid coil or plunger towards the magnetic center of the solenoid and rotating lever 26 about pivot 25 against the bias of spring 28 and thus withdrawing rollers 27 and 51 out of engagement with cam 17 and clip 52 respectively. Roller 35 is thus withdrawn from engagement with cam 29 by spring 40 and the gyroscope is free about the three axes S, R, and P. Also as the solenoid core is centered the end of the core opposite lever 26 advances against switch blade 57 insulatedly mounted on solenoid body 22 and pushes blade 57 out of engagement with stationary switch contact 58, also insulatedly mounted on body 22.

Shown in position in Figure 2 is relay 59 fixed within base 16. As shown schematically in Figure 7, relay 59 comprises a normally open switch 60 having blade 61 hinged at 62 and stationary contact 63 to which blade 61 is thrown by operating stem 64 when operating coil 65 is energized. Relay 59 also includes switch blade 66 hinged at 67 and forming with stationary contact 68 a normally closed switch. With stationary contact 70 blade 66 forms a normally open switch 71 which is closed when switch 69 is opened by stem 64 when coil 65 is energized.

Figure 7:
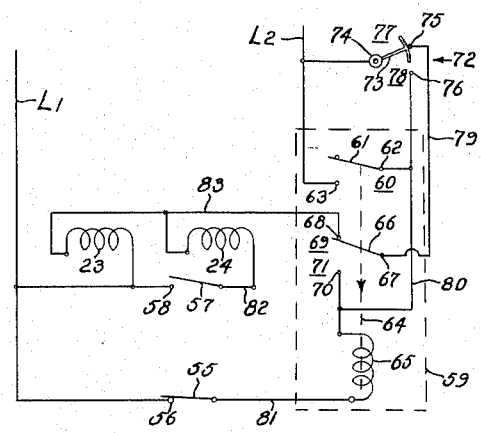
Figure 7 is a schematic wiring diagram of the electric system of this invention.

A remotely mounted caging switch 72 shown in Figure 7 comprises a movable contact blade 73 secured to operating knob 74 adapted to bias blade 73 towards stationary contact 75 and away from stationary contact 76. Blade 73 and stationary contact 75 thus form a normally closed switch 77 which can be opened by turning knob 74 but which will return to closed position if knob 74 is released. Blade 73 and stationary contact 76 form a normally open switch 78 which can be closed by turning knob 74 and can be maintained in closed position by holding knob 74 in its right hand direction of rotation. It should be noted that in the form shown blade 73 is of the overlapping type wherein blade 73 makes contact with point 76 before leaving point 75 and vice versa.

As shown in Figure 7, L1, L2, are lines from an electric power source from which the electric elements of my system may be actuated. L1 is connected to one side of solenoid coil 23, to stationary contact 58 of switch 57—58 and to stationary contact 56 of switch 55, 56. L2 is connected to knob 74 and to stationary contact 63 of switch 60. Wire 79 connects stationary contact 75 with hinge 67 of blade 66. Wire 80 connects stationary contact 76 with hinge 62 of blade 61, with stationary contact 70 and with one side of relay operating coil 65. Wire 81 connects the other side of coil 65 with blade 55 of switch 55—56. Wire 82 connects blade 57 of switch 57—58 to one side of solenoid coil 24. Wire 83 connects stationary contact 68 with the other sides of solenoid coils 23 and 24.

The operation of my system is as follows. In normal operation of the gyroscope the electric parts of my system are as shown in Figure 7 with the only complete electrical circuit including line L2, switch 77, wire 79, switch 69, wire 83, solenoid holding coil 23 and line L1. The solenoid being held in actuated position by coil 23, lever 26 holds rollers 27 and 51 out of engagement with cam 17 and clip 52 respectively, spring 40 holds roller 35 out of engagement with cam 29 and the gyroscope is free about its three axes S, P, and R. Now should the support 11 get displaced from its centered position about the P axis and the gimbal ring get displaced from its centered position about the R axis and it be desired to bring them back to their centered positions, knob 74 of remote switch 72 is turned to the right opening switch 77 and closing switch 78.

When switch 77 opens the circuit through solenoid coil 23 is broken and spring 28 rotates lever 26 clockwise about pivot 25 closing switch 57—58 and bringing cam follower roller 27 into engagement with one of the surfaces of cam 17 thus applying a torque on gimbal ring 12 about the R axis. This torque applied about the R axis causes only a minor movement of the gimbal ring about this axis but in accordance with the well known nature of the gyroscope causes a pronounced precession of support 11 about the P axis until the stop 13 on the support strikes the appropriate stop 14 or 15 on the gimbal ring. The reaction of the appropriate stop 14 or 15 of the gimbal ring on stop 13 of the support causes the gimbal ring to be rotated by the precessional energy of the gyroscope about the R axis in the direction of the torque applied by roller 27 on cam 17. The gimbal ring quickly rotates to its centered position, roller 27 drops into gap 21 thereby locking the gimbal ring and roller 51 engages clip 52 to overcome the bias of spring 40 and cause spring 45 to press roller 35 into engagement with one of the surfaces of cam 29.

Roller 35 thereby impresses a torque on support 11 through cam 29 tending to rotate support 11 towards its centered position. This torque applied to support 11 about the P axis first leads to a precessional torque on the gimbal ring about the R axis but since the gimbal ring is locked in its centered position the reaction of roller 27 on the gimbal ring about the R axis produces a precessional torque on the support about the P axis thus causing the precessional energy of the gyroscope quickly to rotate support 11 about the P axis to its centered position where roller 35 drops into notch 34 in cam 29 and locks support 11 in its centered position. At the same time roller 35 drops into notch 34 screw 52 engages switch blade 55 and pushes it out of engagement with stationary contact 56 breaking the circuit through relay coil 65 and allowing relay switches 60, 69, and 71, to return to their normal positions as shown in Figure 7.

If during this operation of centering or caging the gyroscope knob 74 has been manually held to hold switch 77 open no circuit can be completed through solenoid coils 23, 24 and therefore cam follower rollers 27 and 35 will remain in contact with cams 17 and 29 respectively so that after caging the gyroscope it will remain locked in its caged position.

However, if the caging operation is initiated by rotating knob 74 to open switch 77 and close switch 78 and knob 74 is then released to open switch 78 and close switch 77 it is seen from Figure 7 that when switch 77 is opened the circuit from L2 through switch 77, wire 79, switch 69, and coil 23, to L1 is broken, the solenoid is deenergized and the caging operation starts. When switch 78 is closed a circuit is completed from L2 through switch 78, wire 80, relay coil 65, wire 81, and switch 55, 56 to L1, thus actuating relay 59, opening switch 69 and closing switches 60 and 71. It is seen that switch 60 is in parallel with switch 78 so that when switch 78 is closed to actuate relay 59, switch 60 is closed to continue the energization of relay coil 65 even though knob 74 is released to open switch 78 and again close switch 77. Also switch 69 being held open while relay coil 65 is energized maintains the circuit through the solenoid coils 23, 24 in open condition so that the caging operation will continue to completion regardless of the position of knob 74. Again as a matter of circuit insurance switch 71 in series with switch 77 is in parallel with switch 60 to make doubly sure of holding relay coil energized and the solenoid coils deenergized until the gyroscope is completely caged once the caging operation is started.

When the caging operation is complete as previously explained switch 55, 56 is opened by screw 53 and relay coil 65 is deenergized thus opening switches 60 and 71 and closing switch 69. With switch 77 closed the closing of switch 69 energizes both solenoid coils 23 and 24 and the solenoid rotates lever 26 counterclockwise to release the gyroscope to complete freedom about its three axes. And as above noted when the solenoid is actuated switch 57, 58 is opened to deactivate solenoid coil 24 since both coils 23 and 24 are necessary to overcome the bias of spring 28 but once this is accomplished only coil 23 is required to hold the solenoid in actuated condition.

It is thus seen that starting with the gyroscope uncaged the electric system is as shown in Figure 7, then as switch 78 is closed momentarily the caging of the gyroscope is started and will continue to completion at which time the system will return to the condition shown in Figure 7 with the gyroscope again uncaged unless switch 78 is held closed but if switch 78 is held closed the uncaging of the caged gyroscope will be delayed until switch 78 is allowed to open.

Having thus recited some of the objects of my invention, described a typical form thereof and explained its operation, I claim:

1. In combination with a gyroscope having a rotor adapted for spinning in a support about one axis and means including a gimbal ring mounting said support for freedom about two mutually perpendicular axes other than said spin axis, a centering and caging means including a first cam member rotatable with said gimbal ring, a second cam member rotatable with said support, a pivoted first cam follower member mounted independently of said support and said gimbal ring and including an element carried thereon for engaging said first cam member, a second cam follower member slidably mounted on said gimbal ring and including an element carried thereon for resiliently engaging said second cam member, said first cam follower member being adapted to engage said first cam member until said gimbal ring is centered about one of said mutually perpendicular axes and thereafter to lock said gimbal ring and actuate said second cam follower member to engage said second cam member until said support is centered about the other of said mutually perpendicular axes.

2. The device of claim 1 including stop means on said support and said gimbal ring, said stop means being adapted to limit the rotation of said support about the other of said perpendicular axes about which said support is rotatable in said gimbal ring, said rotation limits being set at less than ninety degrees in either direction from the centered position of said support in said gimbal ring, whereby as said first cam follower member engages said first cam member and thereby urges said gimbal ring towards its centered position about said one axis, said support will precess about said other axis until said precession of said support is stopped by said stop means and when said precession of said support is stopped by said stop means, the reaction of said stops on said support will cause said gimbal ring to precess on said one axis in the direction urged by the reaction of said first cam follower member on said first cam member and said gimbal ring will rapidly precess to its centered position about said one axis where said first cam follower member will lock said first cam member and actuate said second cam follower member to engage said second cam member to urge said support towards its centered position about said other axis thus introducing a couple tending to precess said gimbal ring about said one axis but since said first cam follower member has locked said gimbal ring in its centered position the reaction of said lock on said gimbal ring will cause said support to precess on said other axis in the direction urged by the reaction of said second cam follower member on said second cam member and said support will rapidly precess to its centered position about said other axis.

3. The device of claim 1 including: a source of power, a solenoid having a first coil and a second coil; a first normally closed switch adapted to be opened by said solenoid when said solenoid is energized; a second normally closed switch adapted to be opened by said second cam follower member when said support is centered about the other of said mutually perpendicular axes; a relay including an operating coil, a first normally open switch, a second normally open switch and a third normally closed switch; a single pole double throw switch having a normally closed throw towards which it is biased and a normally open throw; a first circuit including said source of power said normally closed throw of said double throw switch said third normally closed switch and said first solenoid coil, said first normally closed switch and said second coil in series being parallel with said first coil; a second circuit including said source of power, said normally open throw of said double throw switch, said second normally closed switch and said operating coil of said relay; and said two normally open switches of said relay in series being in parallel with the normally open throw of said double throw switch; whereby when said double throw switch is in its normally closed throw position to which it is biased said first coil of said solenoid will be energized and thereby hold said first cam follower member disengaged from said second member; then, when said double throw switch is thrown to its normally open position and released, said relay coil will be energized through said normally open throw from said source of power and said relay will close said two normally open relay switches to form a holding circuit for said relay coil around said normally open throw of said double throw switch, said third normally open switch will open to deenergize said first solenoid coil and said solenoid will release said first cam follower member to engage said first cam member and start the operation of centering said gimbal ring and said support about said two mutually perpendicular axes; and when said support is centered about said other of said axes said second cam follower member will open said second normally closed switch to deenergize said relay coil and energize said first solenoid coil and said second relay coil to disengage said first cam follower member from said first cam member and deenergize said second solenoid coil; thus automatically completing the operation of centering or caging the gyroscope, then uncaging the gyroscope for normal operation.

4. The device of claim 1 including: a source of power, a solenoid having an operating coil; a first normally closed switch adapted to be opened by said second cam follower member when said support is centered about the other of said mutually perpendicular axes; a relay including an operating coil, a first normally open switch, a second normally open switch and a second normally closed switch; a single pole double throw switch having a normally closed throw towards which it is biased and a normally open throw; a first circuit including said source of power, said normally closed throw of said double throw switch, said second normally closed switch and said solenoid coil; a second circuit including said source of power, said normally open throw of said double throw switch, said first normally closed switch and said operating coil of said relay; and said two normally open switches of said relay in series being in parallel with the normally open throw of said double throw switch; whereby when said double throw switch is in its normal position said solenoid will be energized to hold said first cam follower member disengaged from said first cam member; then when said double throw switch is thrown to its other position and released said relay coil will be energized, said two normally open switches will form a holding circuit for said relay coil around said normally open throw of said double throw switch, and said solenoid will release said first cam follower member to engage said first cam member and start the operation of centering said gimbal ring and said support about said two mutually perpendicular axes; and when said support is centered about said other one of said axes said second cam follower member will open said first normally closed switch to deenergize said relay coil and energize said solenoid coil to disengage said first cam follower member from said first cam member thus automatically completing the operation of centering or caging said gyroscope, then uncaging the gyroscope for normal operation.

5. In combination with a gyroscope having a rotor adapted for spinning in a support about a spin axis and means including a gimbal ring mounting said support for freedom about two mutually perpendicular axes other than said spin axis, mechanical means adapted when released to first center said gimbal ring about one of said other axes and hold said gimbal ring centered while centering said support about the other of said other axes, and electrical means adapted when energized to release said gimbal ring and said support from said caging means to restore the gyroscope to freedom about said other axes, said electrical means comprising means for energizing said electrical means, instantaneous switch means for deenergizing said electrical means, and sequential means operated by said instantaneous switch means for maintaining the deenergization of said electrical means until both said gimbal ring and said support are centered and then restoring the energization of said electrical means.

6. In combination with a gyroscope having a rotor adapted for spinning in a support about a spin axis and means including a gimbal ring in which said support is mounted for freedom of rotation about a support axis and a frame in which said gimbal ring is mounted for freedom of rotation about a gimbal axis perpendicular to said support axis, of centering means for said gimbal ring in said frame and said support in said gimbal ring comprising a first cam member adapted to rotate with said gimbal, a first cam follower mechanism carried on said frame, a second cam member adapted to rotate with said support, and a second cam follower mechanism carried on said gimbal ring, said first cam follower mechanism comprising a lever pivoted on said frame, a first roller carried on said lever and resilient means strained between said frame and said lever adapted to bias said first roller into contact with said first cam member to center said gimbal ring in said frame, said second cam follower mechanism comprising a first slider, a second slider, a second resilient means strained between said sliders and adapted to bias said second slider towards said second cam member, a second roller carried on said second slider to contact said second cam, stop means on said sliders adapted to limit the relative motion thereof, a first resilient means strained between said gimbal ring and said first slider adapted to bias said first slider away from said second cam, said first roller when said gimbal ring is centered in said frame being adapted to actuate said first slider to overcome the bias of said first resilient means and move said sliders to contact said second roller on said second cam.

References Cited in the file of this patent

UNITED STATES PATENTS

| | | |
|---|---|---|
| 2,524,553 | Wendt | Oct. 3, 1950 |
| 2,580,748 | Fillebrown | Jan. 1, 1952 |
| 2,641,133 | Barkalow et al. | June 9, 1953 |
| 2,645,129 | Brown | July 14, 1953 |